(12) United States Patent
Lopez et al.

(10) Patent No.: US 10,469,906 B2
(45) Date of Patent: Nov. 5, 2019

(54) METHOD AND APPARATUS FOR AUTHORIZING RECEPTION OF MEDIA PROGRAMS ON A SECONDARY RECEIVER BASED UPON RECEPTION OF THE MEDIA PROGRAM BY A PRIMARY RECEIVER

(71) Applicant: Fox Latin America LLC, Los Angeles, CA (US)

(72) Inventors: Hernan Lopez, Los Angeles, CA (US); Guillermo Contreras, Santiago (CL); Maria Victoria Arostegui, Buenos Aires (CL); Leonardo Rosales, Guatamala (GT); Ricardo Mazariegos, Guatamala (GT); Matias Dere, Buenos Aires (AR); Pablo Mintz, Buenos Aires (AR); Juan Weiss, Buenos Aires (AR); Juan M. Sola, Atlanta, GA (US); Christopher Douglas Blandy, Los Angeles, CA (US); Christen Cecilia Chambers, Los Angeles, CA (US); Casey Frith-Smith, Los Angeles, CA (US)

(73) Assignee: FOX Latin American Channel LLC, Los Angeles, CA (US)

( * ) Notice: Subject to any disclaimer, the term of this patent is extended or adjusted under 35 U.S.C. 154(b) by 0 days.

(21) Appl. No.: 15/568,459

(22) PCT Filed: Apr. 21, 2016

(86) PCT No.: PCT/US2016/028698
§ 371 (c)(1),
(2) Date: Oct. 20, 2017

(87) PCT Pub. No.: WO2016/172376
PCT Pub. Date: Oct. 27, 2016

(65) Prior Publication Data
US 2018/0176644 A1    Jun. 21, 2018

Related U.S. Application Data

(60) Provisional application No. 62/150,771, filed on Apr. 21, 2015.

(51) Int. Cl.
H04N 21/454    (2011.01)
H04N 21/4627    (2011.01)
(Continued)

(52) U.S. Cl.
CPC ......... H04N 21/4627 (2013.01); H04L 65/60 (2013.01); H04N 21/25875 (2013.01);
(Continued)

(58) Field of Classification Search
CPC combination set(s) only.
See application file for complete search history.

(56) References Cited

U.S. PATENT DOCUMENTS 5,389,964 A    2/1995    Oberle et al.
5,805,704 A    9/1998    Hsu
(Continued)

OTHER PUBLICATIONS

PCT International Search Report & Written Opinion dated Jul. 28, 2016 for PCT Application No. PCT/US2016/028698.
(Continued)

Primary Examiner — Michael H Hong
(74) Attorney, Agent, or Firm — Farjami & Farmjami LLP

(57) ABSTRACT

A method, apparatus, and system for authorizing reception of one or more media programs of a content provider by a secondary receiver based upon reception of the media program by a primary receiver is disclosed. In one embodiment, the method comprises the steps of receiving location data (Continued)

from the secondary receiver, initiating authorized reception of a transmitted first media program having audio content of the one or more media programs by the primary receiver, receiving the audio content of the media program reproduced by the primary receiver from the secondary receiver, and authorizing reception of the one or more programs of the content provider by the secondary receiver according to the received location data and a comparison of the received audio content of the media program and the audio content of the transmitted first media program.

23 Claims, 7 Drawing Sheets

(51) Int. Cl.
| | |
|---|---|
| *H04N 21/258* | (2011.01) |
| *H04N 21/414* | (2011.01) |
| *H04N 21/422* | (2011.01) |
| *H04N 21/439* | (2011.01) |
| *H04N 21/475* | (2011.01) |
| *H04N 21/658* | (2011.01) |
| *H04W 4/02* | (2018.01) |
| *H04L 29/06* | (2006.01) |

(52) U.S. Cl.
CPC . *H04N 21/41407* (2013.01); *H04N 21/42203* (2013.01); *H04N 21/4394* (2013.01); *H04N 21/4753* (2013.01); *H04N 21/6581* (2013.01); *H04W 4/023* (2013.01); *H04N 21/454* (2013.01)

(56) References Cited

U.S. PATENT DOCUMENTS

| | | |
|---|---|---|
| 8,069,468 B1 | 11/2011 | Shah et al. |
| 2009/0043501 A1 | 2/2009 | Lohi et al. |
| 2011/0055862 A1 | 3/2011 | Harp et al. |
| 2011/0238853 A1 | 9/2011 | Paul et al. |
| 2011/0307931 A1* | 12/2011 | Shuster ............ G06Q 30/0207 725/105 |
| 2014/0007154 A1* | 1/2014 | Seibold ............ H04N 21/4122 725/25 |
| 2015/0046939 A1 | 2/2015 | Oliver |
| 2016/0066054 A1* | 3/2016 | Lorrain ............ H04N 21/482 725/38 |

OTHER PUBLICATIONS

PCT International Preliminary Report on Patentability dated Oct. 19, 2017 for PCT Application No. PCT/US16/28698.

* cited by examiner

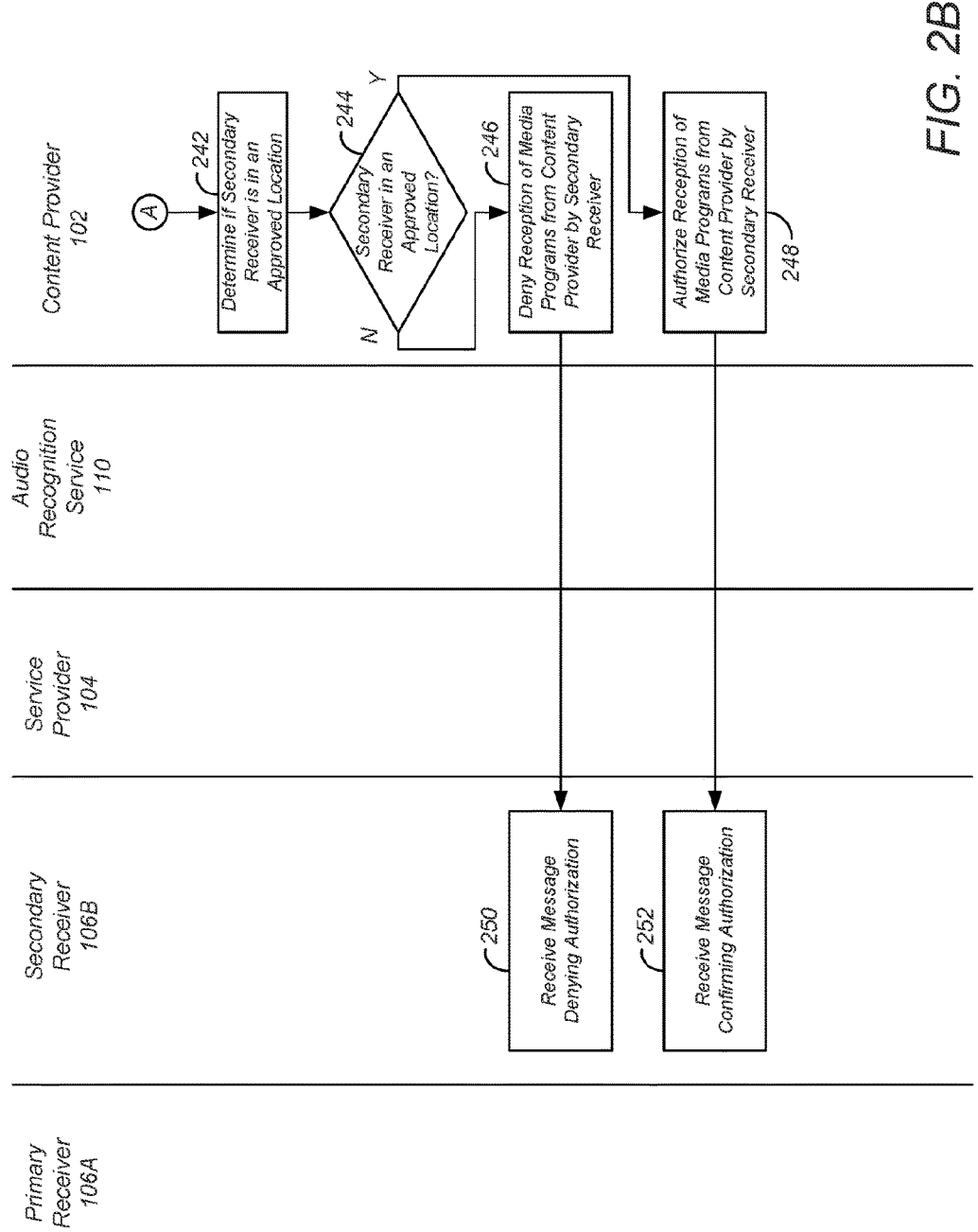

METHOD AND APPARATUS FOR AUTHORIZING RECEPTION OF MEDIA PROGRAMS ON A SECONDARY RECEIVER BASED UPON RECEPTION OF THE MEDIA PROGRAM BY A PRIMARY RECEIVER

CROSS-REFERENCE TO RELATED APPLICATIONS

This application is a National Stage Application of International Application No. PCT/US2016/028698, entitled "METHOD AND APPARATUS FOR AUTHORIZING RECEPTION OF MEDIA PROGRAMS ON A SECONDARY RECEIVER BASED UPON RECEPTION OF THE MEDIA PROGRAM BY A PRIMARY RECEIVER," by Hernan Lopez et al. filed Apr. 21, 2016, which International Application claims benefit of U.S. Provisional Patent Application No. 62/150,771, entitled "METHOD AND APPARATUS FOR AUTHORIZING RECEPTION OF MEDIA PROGRAMS ON A SECONDARY RECEIVER BASED UPON RECEPTION OF THE MEDIA PROGRAM BY A PRIMARY RECEIVER," by Hernan Lopez et al., filed Apr. 21, 2015, both of which applications are hereby incorporated by reference herein.

BACKGROUND OF THE INVENTION

1. Field of the Invention

The present invention relates to systems and methods for authorizing devices to playback media programs, and in particular to a system and method for authorizing secondary devices to receive media programs based upon reception of the media program by a primary receiver.

2. Description of the Related Art

The delivery of media programs to consumers has traditionally involved the direct broadcast of those media programs to viewers' homes. Initially, these broadcasts were to local markets, using terrestrial transmitters and reception equipment built in to commercially available television receivers. Later, transmission of media programs via cable to specialized equipment installed in viewers' homes was introduced. Still later, signal transmission was accomplished via satellite transmission, again with specialized equipment installed in the viewers' homes. Both the cable and satellite transmission of media programs are typically made to subscribing viewers, who pay a fee for such services. The cable and satellite providers (hereafter generally referred to as service providers) typically acquire rights to broadcast media programs from content providers who have either originated or produced the media programs, or have contracted for the rights to provide such media programs from others.

In recent years, there has been a trend towards the transmission and reception (transception) of media programs via the Internet, with reception being accomplished using general purpose processors and equipment such as desktop computers, laptops, tablets, and smartphones. Such Internet transception may be wired or wireless.

Increasingly, viewers would like the option of viewing media programs available as a part of their service provider subscription in remote locations. For example, a viewer may wish to view their favorite media program via a smartphone at a location remote from their home, where the specialized reception equipment may be installed.

This can be accomplished by downloading, installing, and executing a service provider smartphone application on the viewer's smartphone, and receiving the media program in the smartphone via Internet transception. This may be implemented in two paradigms. In the first paradigm the service provider provides an application to be installed on the viewer's smartphone. The viewer provides information regarding their identity to the service provider, selects the media program they wish to view on the smartphone, and the media program that the service provider obtains from the content provider is transmitted to the viewer's smartphone by the service provider, for reproduction within the service provider's application.

In a second paradigm, the content provider provides the application to be installed on the viewer's smartphone. Since the viewer is not known to be a subscriber to the content provider's content, the viewer is prompted, via the smartphone application, to enter which service provider the viewer subscribes to, and the user's service provider credentials. The content provider uses these credentials to verify that the viewer is entitled (by virtue of their subscription with the service provider) to receive the requested content, thus permitting the reception of the content via the smartphone as well as the viewer's television set to be authorized.

Unfortunately, with either paradigm, the viewer may not possess the information (e.g. login credentials for the service provider) at their fingertips. Further, even if the viewer is a subscriber of a service, the viewer must typically create a user account with the service provider, to get such logon credentials. Although this requirement is straightforward, it prevents many possible viewers from remotely obtaining content.

What is needed is an apparatus and method for authorizing reception of media programs from content providers that is simple, easy to execute, yet reasonably secure. The following disclosure describes such an apparatus and method.

SUMMARY OF THE INVENTION

To address the requirements described above, the present invention discloses a method, apparatus, and system for authorizing reception of one or more media programs of a content provider by a secondary receiver based upon reception of the media program by a primary receiver. In one embodiment, the method comprises the steps of receiving location data from the secondary receiver, initiating authorized reception of a transmitted first media program having audio content of the one or more media programs by the primary receiver, receiving the audio content of the media program reproduced by the primary receiver from the secondary receiver, and authorizing reception of the one or more programs of the content provider by the secondary receiver according to the received location data and a comparison of the received audio content of the media program and the audio content of the transmitted first media program. In another embodiment, the apparatus comprises a processor having a memory storing processor instructions for performing the foregoing operations.

BRIEF DESCRIPTION OF THE DRAWINGS

Referring now to the drawings in which like reference numbers represent corresponding parts throughout:

FIGS. 2A and 2B are diagrams illustrating exemplary operations that can be performed to use the previous authorization of a primary receiver to receive media programs to conveniently authorize a secondary receiver to receive the media programs based on the same user subscription;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Described below is a system and method in which the audio portion of content being transmitted on an authorized channel and received on a previously authorized primary receiver is used to authenticate a second receiver. When the user wishes to authenticate the second receiver using audio authentication, they are instructed to tune their primary receiver to an authorization channel. The secondary receiver then senses the audio reproduced by the primary receiver, and this sensed audio used to authenticate or validate the second receiver.

Content Distribution System

Figure 1:
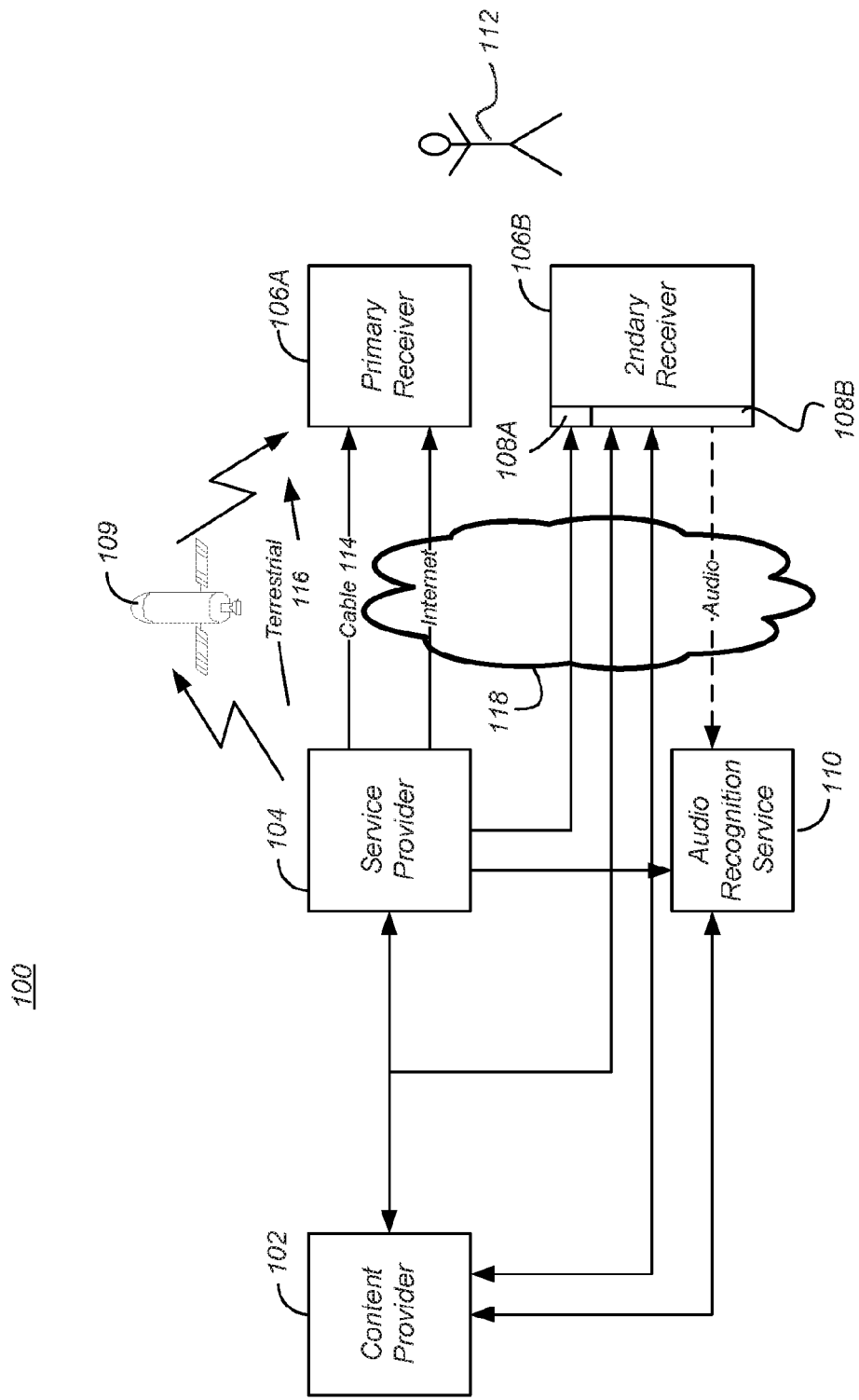
FIG. 1 is a diagram of an exemplary content distribution system.

FIG. 1 is a diagram of an exemplary content distribution system (CDS) 100. The CDS 100 comprises one or more content providers 102, communicatively coupled with one or more service providers 104. Content providers 102 generate or arrange for the provision of media programs that are ultimately provided for consumption (e.g. viewing) by subscribers or users 112. Examples of content providers 102 include traditional "network" broadcasters such as FOX, ABC, CBS, and NBC, non-traditional content providers such as HBO and THE DISCOVERY CHANNEL and THE WEATHER CHANNEL. The content providers 102 typically provide media programs and other content to one or more service providers 104 for a fee. The service provider(s) 104 accept the media programs from the content providers 102 and transmit the media programs for viewing by user subscribers 112, also typically for a fee. Traditionally, such transmission is via cable (copper or optical) transmission 114 or wireless (terrestrial 116, or satellite 109) transmission. Also typically, such transmissions were received by specialized equipment in the subscriber's home or business. Such specialized equipment can include a set-top box (STB) or integrated receiver/decoder (IRD), and if the transmissions are wireless, an appropriate antenna such as a satellite dish or outdoor antenna. Such specialized equipment is alternatively referred to hereinafter as a receiver 106. Such transmissions can also be received via the Internet 118. This may be accomplished by a receiver 106 having suitable processing and software (e.g. a web-browser) or other functionality, such as a smartphone, or computer system as described further below.

"Media program(s)," as referred to herein, refer to media content such as audiovisual works. This includes movies, television shows, episodes of a series of television shows, even audio content such as music, which is commonly available from some service providers 104 on specific genre-related channels (e.g. rock, blues, pop, rap) with minimal or no video (image) content.

A subscribing user 112 may have more than one receiver 106 by which they would like to receive media programs. This not only includes multiple STBs or similar devices in the user's home or business, but also mobile processing devices such as a smartphone, tablet computer, laptop or similar device. In an illustrative embodiment, a primary receiver 106A comprises an STB, desktop computer, and the like, while the secondary receiver 106B may comprise a smartphone, tablet, or similar device.

Using the secondary receiver 106B, subscribing users 112 may obtain access to media programs ultimately supplied by the content provider either from the service provider 104 or directly from the content provider. This allows subscribing users 112 to view media programs they have subscribed to (either by subscription from the service provider 104 or directly with the content provider 102) in remote locations using mobile devices such as the secondary receiver 106B. The provision of such media programs from the service provider 104 is typically provided via a service provider application 108A executing on the secondary receiver, which can be downloaded from the service provider 104 or third party (e.g. the APPLE STORE) and installed on the secondary receiver 106B. Provision of such media programs directly from the content provider 102 is provided via a content provider application 108B, which can be downloaded from the content provider 102 or third party and installed on the secondary receiver 106B.

As described above, when a user 112 desires to receive media programs directly from the content provider 102 using the secondary receiver 106B, and the user has subscribed to receive the media programs via a service provider 104 subscription, the user is prompted to enter some kind of identifier or credentials to the content provider to show that they are authorized to receive the media program from the content provider 102 by virtue of their subscription to a service provider 104 providing the same media program. This process typically entails downloading and installing the content provider application (CPA) 108B on the secondary receiver 106B, and using this CPA 108B to provide credentials (typically a user ID or email address and a password) showing that they are a subscriber of the service provider 104. Such credentials must typically be pre-arranged with the service provider 104 by logging in to a website associated with the service provider 104, and creating an account using the user credentials.

The user credentials are provided to the service provider 104. Preferably, this is accomplished by the content provider 102 referring the secondary receiver 106B to a login form hosted or controlled by the service provider 104. The user 112 can enter their credentials on the form, thus providing the credentials to the service provider 104 without exposing them to the content provider 102. If the user's credentials indicate they are authorized to receive the media program by virtue of their subscription to the service provider's services, the service provider 104 returns a message to the content provider 102 indicating that the user 112 is indeed a subscriber to a package that includes the requested media program (or all media programs from the content provider 102). The content provider 102 can use this information to approve the user's request for access to the media program(s) via the secondary receiver 106B.

The referral of the secondary device 106B to the login form of the service provider 104 can be implemented via a webview command implemented by the CPA 108B, for example, by a webview command that includes the URL of a login page of the service provider 104. The referral may include data identifying the secondary receiver 106B and/or content provider 102 so that the service provider 104 is aware to whom to send the foregoing message confirming that the user 112 is an authorized subscriber.

The referral may also be implemented by an inline frame (IFrame). An IFrame is an HTML document embedded inside another HTML document on a website, that can be used to insert content from another source.

In another embodiment, the user credentials may be provided to the content provider 102, who supply such credentials to the user's service provider 104. As described above, the problem with this authorization technique is that (1) it typically requires the user 112 to set up a user account with the service provider 104 to obtain the credentials they will provide to the content provider 102 and (2) it requires the user 112 to remember these credentials and to enter them when prompted by the secondary receiver 106B. While this would seem to be a small hurdle, it dissuades many users from viewing the content provider's media programs on secondary receivers.

As described, the CDS 100 is augmented with an audio recognition service (ARS) 110 that can receive audio information from the secondary receiver (either directly or via the content provider 102) and compare it to audio information obtained from the service provider 104 and/or the content provider 102 and/or local broadcasters as further described below. The ARS 110 may also account for synchronization issues caused by transmission delays or transmissions in different time zones, using, for example, time stamping of the audio information received, potentially using a global clock such as that which is available through cellphone networks or a global positioning network. This can be accomplished, for example, by storing a timestamped version of the audio content of the transmitted first media program (e.g. by including a time stamp with each data packet of the audio content), time stamping the audio data from the secondary receiver 106B (either at the secondary receiver 106B or upon receipt by the content provider 102), aligning the time stamps to synchronize the audio content and audio data, and comparing the now synchronized audio content and audio data.

Figure 2A:
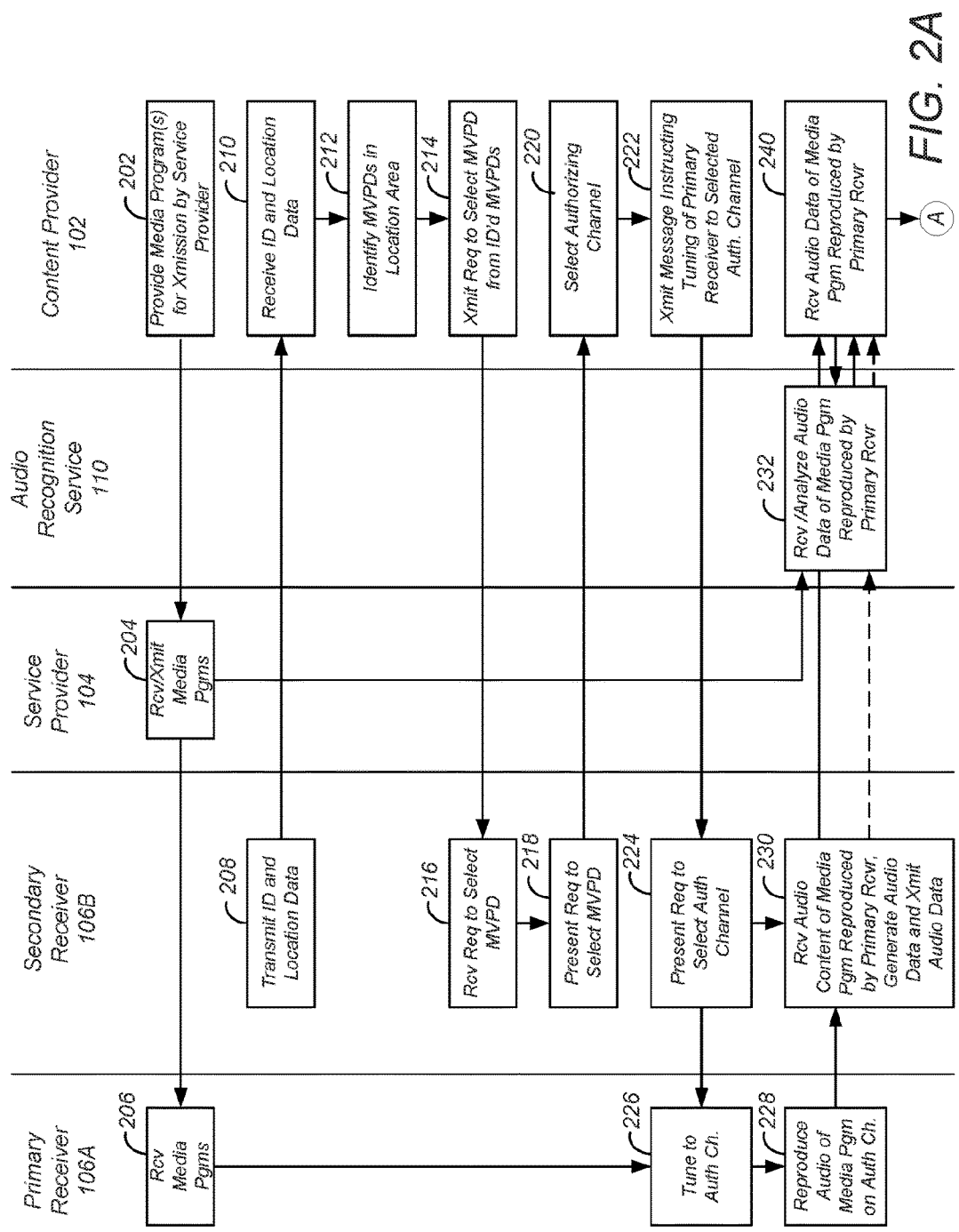

FIGS. 2A and 2B are diagrams illustrating exemplary operations that can be performed to conveniently authorize a secondary receiver 106B to receive the media program based on a user 112 subscription indicating that a primary receiver 106A has been authorized to receive the same media program.

In block 202, the content provider 102 provides media program(s) to the service provider 104. Such provision can be made by wireless or wired transmission, or by delivering a physical media having the media program(s). In block 204, the service provider 104 receives the media program(s), processes such media program(s), and transmits the processed media program(s) to the user's 112 primary receiver 106A for presentation and viewing by the a user 112 subscribing to the service provider's 104 package that includes the media program(s).

If the user 112 desires to receive one or more of the media programs via a secondary receiver 106B, the user 112 may obtain the CPA 108B, and install this application on the secondary receiver 106B. Using this CPA 108B, the user 112 initiates a request to receive at least one media program that they have subscribed to via the service provider 104 by sending a message to the content provider 102 using the secondary receiver, as shown in block 208. This request may include an identifier of the secondary receiver 106B itself (for example, a serial number of the secondary receiver that can be read by the CPA 108B) as well as location data describing the location of the secondary receiver 106B. This location data may be derived from one or more of a plurality of different geolocation data sources and techniques. One such geolocation source is a hardware or software module in the secondary receiver 106B that performs global or near-global navigation from passively received signals. One such module may be a global positioning system (GPS) module integrated with the secondary receiver 106B. GPS is a system in which data is passively received from satellites in orbit, and the data is used by the GPS module to determine the position of where they are received. Another such geolocation source is a cellphone module that may be included with the secondary receiver 106B. The cellphone module performs the functions necessary to transmit and receive wireless telephone calls with one or more wireless networks, and hence, is capable of determining the identity of each cellphone transmitter it comes in contact with. Such information does not permit the location of the secondary receiver 106B to be determined as accurately as GPS data, but can be used to check or augment GPS data, and is also useful in locations where a GPS or analogous signal cannot be obtained. Still another geolocation source of such information is the second receiver's IP address used in communicating with the content provider 102. Such address information can be associated with a geographic map, and the approximate location of the second receiver 106B divined from this information. In one embodiment, particular emphasis is placed on the relationship between the IP address of the primary receiver 106A (if any) and the secondary receiver 106B, to assure they are reasonably co-located.

Returning to FIG. 2A, the content provider 102 receives the secondary receiver 106B identifying and location data, as shown in block 210. The content provider 102 uses this information to identify service providers 104 (otherwise known as and alternatively referred to hereinafter as multi-channel video programming distributors or MVPDs) in the geographical area of the secondary receiver 106B. For example, the content provider may have information that the secondary receiver 106B is located in an area in which the service providers 104 DIRECTV, DISH NETWORK, and CABLEVISION are providing services to users. Those service providers 104 will then be identified by the content provider 102 in block 212. The content provider 102 then transmits a request for the user 112, using the secondary receiver 106B, to select a service provider 104 from among the identified service providers. This request is in the form of data, which when processed by the secondary receiver 106B, causes the secondary receiver 106B to present information on an user interface to be perceived by the user 112 and to accept a user's choice of one of the service providers. Block 216 illustrates the reception of the data in the secondary receiver 106B, and block 218 illustrates the presentation of the user interface to the user 112.

The user 112 enters their selected service provider 104, and this information is transmitted to the content provider 102, also as shown in block 218. In block 220, the content provider 102 receives the service provider 104 selection. The content provider 102 then selects at least one transmission channel (hereinafter alternatively referred to as the "authorizing or authorization channel") as the basis for authorizing the secondary receiver 106B.

The selection of a suitable authorizing channel is performed by a service that has access to information describing the channels of information available at the set of possible locations for given service providers, and maps the location specified by the location information and selected service provider to a selected one of the available channels.

In one embodiment, the selection of the authorization channel includes an analysis of the audio content of candidate authorization channels to find audio content that is most suitable for authorization purposes. For example, the audio content of a particular channel may include spectral or temporal features that make the audio content particularly unique, thus allowing a more accurate or more rapid comparison with expected audio content to authorize the secondary receiver 106B.

In this context, "channel" can refer to any allotment of transmission capacity that is used to transmit information. For example, channels may be defined according to frequency (e.g. frequency division multiple access or FDMA), time (e.g. time division multiple access or TDMA), code (e.g. code division multiple access or CDMA), IP or multicast address, or any combination of such definitions. The information on the authorizing channel will be received by the primary receiver 106A, sensed by the secondary receiver 106B, and used to authenticate the secondary receiver so that it may receive analogous services.

Returning to FIG. 2A, the content provider 102 initiates the authorized reception of a transmitted first media program having audio content by the primary receiver. In the embodiment illustrated in FIG. 2A, this is accomplished by transmitting a message to the secondary receiver 106B to tune the primary receiver 106A to the selected authorization channel, as shown in block 222. In block 224, the secondary receiver 106B receives the message and presents the request to tune the primary receiver 106A to the authorization channel to the user 112. The primary receiver 106A is then tuned to the authorization channel, as shown in block 226. The primary receiver 106A receives and reproduces the media program being transmitted on the authorization channel by the service provider 104. As the content of the received media program also includes audio content, the audio content portion of the media program is also reproduced. This audio content portion is received or sensed by the secondary receiver 106B (for example, with an integrated microphone used for other secondary receiver 106B functions). The audio content portion that is received or sensed by the secondary receiver 106B is used to generate audio data that is provided for analysis.

Next, the audio data generated from the received and sensed audio content of the media program being transmitted on the authorization channel is compared to the audio content of the media program transmitted by the service provider 104, and this comparison is used to determine whether reception of the media program or other content from the content provider 102 is authorized on the secondary receiver 106B, as shown in block 232. The result of the comparison is transmitted to the content provider 102, where it is received, as shown in block 240.

The operations required to compare the audio data generated from the sensed audio content with the transmitted audio content and decide whether to authorize reception of content from the content provider 102 can be performed by different combinations of the entities illustrated in FIGS. 1 and 2.

In a first embodiment illustrated in FIG. 2A, this is accomplished by transmitting the audio data generated from the sensed audio content to the content provider 102 using the CPA 108B, which in turn provides the received audio data to the ARS 110. The audio recognition service 110 also accepts the audio content of the transmitted media program from the service provider 104 (e.g. by dedicated transmission from the service provider 104 or by use of am authorized device analogous to the primary receiver 106A), and compares them to determine if the audio data generated from the audio content reproduced by the primary receiver 106A and sensed by the secondary receiver 106B matches the audio content transmitted by the service provider 104.

As no processing is instantaneous and no reproduction is lossless, it is important that the ARS 110 account for delays and distortion in the transmission, reception and processing of both signals (from the secondary receiver 106B and from the service provider 104) having the audio content. For example, delays and distortions inherent to (1) the reception and processing of the signal having the audio content from the service provider 104, (2) the reproduction of the audio content by the primary receiver 106A, (3) the sensing of the audio content by the secondary receiver 106B and generation of audio data therefrom, and (4) the transmission of the sensed audio content to the ARS 110 should all be considered. Likewise, any delays and distortions inherent to the transmission, processing, and reception of the audio content directly from the service provider 104 must be considered.

Such delays and distortions can be predictable or largely stochastic in nature. Predictable delays can be accounted for by time-shifting one or both of the signals with the audio content by a known amount determined from the predicted delay values. For example, if the service provider 104 is known to insert a delay of X seconds before transmitting the media program, no delay need be accounted for, because the delay will affect both the signal received directly from the service provider 104 and from the secondary receiver 106B as sensed by the primary receiver. However, if the transmission paths are of different length (e.g. the primary receiver 106A receives the signal from the service provider 104 via satellite 109, but the ARS 110 receives the signal from the service provider 104 via internet transmission) or if the primary receiver 106A is known to add a delay of Y seconds before reproducing the audio portion of the signal, such delays are predictable and may be accounted for. If the primary receiver 106A processing is known to differ for different models (or for that matter, the processing of the secondary receiver 106B in transmitting the audio portion to the ARS 110 differ by model), such differences may be predictable and simply accounted for.

Stochastic (and predictable) delays can be reduced by time-tagging the data received by the secondary receiver 106B to a global time standard. This global time standard may be a GPS clock or a clock available from the cellphone subsystem of the secondary receiver 106B. The ARS 110 can use the time-tags to temporally align the audio content received from the secondary receiver 106B and the service provider 104, to determine if the audio content from each is matched sufficiently to justify a reasonable conclusion that the audio content received from the secondary receiver was ultimately obtained from a the user's authorized primary receiver 106A.

In another embodiment, the secondary receiver 106B transmits the sensed audio data directly to the ARS 110 (instead of transmitting the data to the ARS 110 via the content provider 102).

In a further embodiment, the ARS 110 is integrated with the content provider 102 (e.g. it does not comprise a separate entity).

In still another embodiment, the processing completed to compare the audio of the audio content received directly from the service provider 104 and the audio received by the primary receiver 106A and sensed by the secondary receiver 106B is shared between the secondary receiver 106B and the ARS 110 or content provider 102. For example, instead of transmitting the audio data generated from the sensed audio content itself, the CPA 108B executing on the secondary receiver 106B may perform an analysis of the audio data, and transmit the result of the analysis to the ARS 110 or content provider 102. Such analysis may be the result of a temporally varying spectral analysis of the generated audio data (e.g. a Fourier transform), and may include only Fourier or similar coefficients. The ARS 110 or content provider 102 may perform a similar analysis of a portion of the audio content from the service provider 104 and attempt to match the resulting coefficients for a sliding time window to account for processing or transmission delays.

In yet another embodiment, the CPA 108B of the secondary receiver 106B performs the operations of the ARS 110. This can be implemented in a system wherein the content provider 102 receives the media program from the service provider 104 on the selected authorization channel, and transmits the audio portion of the media program transmitted by the service provider 104 on the authorization channel and received by the content provider 102 from the content provider 102 to the secondary receiver 106B for analysis and comparison using the CPA 108B.

In one embodiment, the determination as to whether reception of the media program or other content from the content provider 102 is to be authorized on the second receiver 106B also examines whether the secondary device is located at an approved location.

FIG. 2B is a diagram further illustrating this feature. In block 242, the content provider 102 determines whether the secondary receiver 106B is in an approved location. This can be determined, for example, using the location data and ID received in block 210 of FIG. 2A. If the secondary receiver 106B is in an approved location (as determined by block 244), reception of the media programs from the content provider 102 by the secondary receiver 106B is authorized, and an enabling message is transmitted to the secondary receiver 106B as shown in block 248. In block 252, that information is received by the secondary receiver 106B and used to receive the media programs. The enabling message may include digital certificates, encryption keys, or other information required by the secondary receiver 106B to receive, decode, and decrypt the media programs from the content provider. Alternatively, the content provider 102 may simply provide the secondary receiver 106B with information required to retrieve the required media programs from the content provider 102 (for example, a URL or multicast internet protocol address). Similarly, if the secondary receiver is not in an approved location (as determined by block 244), reception of the media programs by the secondary receiver 106B is denied, and a message indicating as such may be transmitted to the secondary receiver 106B where it is received, as shown in blocks 246 and 250.

The selection of the authorization channel depicted in block 220 of FIG. 2A may be practiced in several embodiments. Since the method uses the reception of the content over the authorization channel by the primary receiver 106A as a proxy for confirming that the user 112 (or user's primary receiver 106A) is entitled to receive the media program using the secondary receiver 106B, it desirable that whatever media program is received over the authorization channel may only be synchronously received by authorized users 112 or authorized primary receivers 106A. For example, if an authorization channel was selected that included a broadcast of a media program commonly available on a non-subscription (free) basis at the location of the secondary receiver 106B, a user 112 could simply tune the primary receiver to that broadcast channel and provide the same audio to the content provider 102. This audio may be obtained whether the user 112 subscribes to the service provider 104 or not, and if synchronous with the audio reproduced by the primary receiver 106A receiving the media program, may be indistinguishable from that which would have been provided by an authorized service provider 104 to which the user 112 subscribes. Hence, in one embodiment, the authorization channel selected by the content provider 102 excludes any transmission channel that is transmitting a media program that is available over the air using a free or non-subscribed network.

In one embodiment, the content provider 102 changes the authentication channel for a given location of the secondary receiver 106B so that it is not the same each time the authentication is attempted. This makes it harder for an authorized user 112 to conspire with unauthorized users to authenticate multiple devices in the vicinity. In another embodiment, when one or more other secondary receivers 106B requesting authorization are in the same geographical region, an authorization channel is assigned to each requesting secondary receiver 106B.

The content provider 102 may also transmit the authentication channel information to the secondary receiver 106B and receive the audio information (as discussed below) in a secure session keyed to an identifier of the secondary receiver 106B, thus pairing the transmission of the authorization channel and the reception of the audio content. For example, if a user 112 is a subscriber to a service provider 104 that is broadcasting a particular media program ultimately provided by the content provider 102, and the user 112 is in a room with multiple other users that are not subscribers to the service provider 104, other persons in the room may tune their own secondary receivers 106B to receive the audio from the primary receiver 106A and transmit the received audio to the content provider 102. However, those other users must have previously transmitted valid service provider 104 credentials to the content provider 102, otherwise, the content provider will not associate the received audio data with that particular secondary receiver 106B. Audio data received without an ID and location or audio data received with the same ID and location as a recently received ID and location can be identified by the content provider as fraudulent.

Further, in one embodiment, selected authorization channels are limited to linear 24/7 cable channels such as ESPN. In this case, off the air (OTA) broadcast channels and channels transmitting other regional broadcasts may eliminated from the pool of acceptable authorization channels, as it would be difficult to authenticate the device because of extensive time delays involved among regional broadcasts. In another embodiment, regional broadcasts during prime time may still be used in embodiments wherein the audio recognition service 110 receives audio information from the service provider 104 and secondary receiver 106B that are sufficiently time tagged to allow them to be correlated when appropriate. Regional broadcasts during non-prime time hours may also be selected for the authorization channel if the audio recognition service 110 receives information from that local broadcaster.

In still another embodiment, the audio content of a sequence of authorization channels is utilized for authorization purposes. In this embodiment, the message instructing the tuning of the primary receiver to the authorization channel (depicted in block 222) instructs the tuning of a sequence of authorization channels, with the audio content of each of the sequence of audio channels being sensed and compared to the audio content of the sequence of channels. This embodiment takes advantage of the fact that the sequence of channels transmitted by any particular service provider is typically different than every other service provider, even if both service providers ultimately might transmit the same media program at the same time. For example if a first service provider 104 transmits a media program on channel 100 and a second service provider 104 transmits the same media program on channel 202 at the same time (synchronously), that information might be used by an individual to authorize reception using the secondary receiver 106B by merely turning to channel 202 of the second service provider 104 (to which the user has authorized access) instead of channel 100 from the first service provider (to which the user does not have authorized access). However, if a sequence of channels is used, the primary receiver 106A may be directed to be tuned to channels 100, 101 and 102, of the first service provider 104, and it is unlikely that the second service provider 104 will broadcast the same media programs on any sequence of channels (e.g. channels 202, 203, and 204). The message instructing the tuning of the primary receiver 106A to the sequence of channels may also be provided directly to the primary receiver 106A, so that the sequence of channels is automatically tuned. This may be implemented, for example, by including, within the secondary receiver 106B (for example, by including the functionality in the CPA 108B), the capability to command the primary receiver 106A to the authorization channel(s) described in the message provided in block 222 of FIG. 2A.

Figure 3:
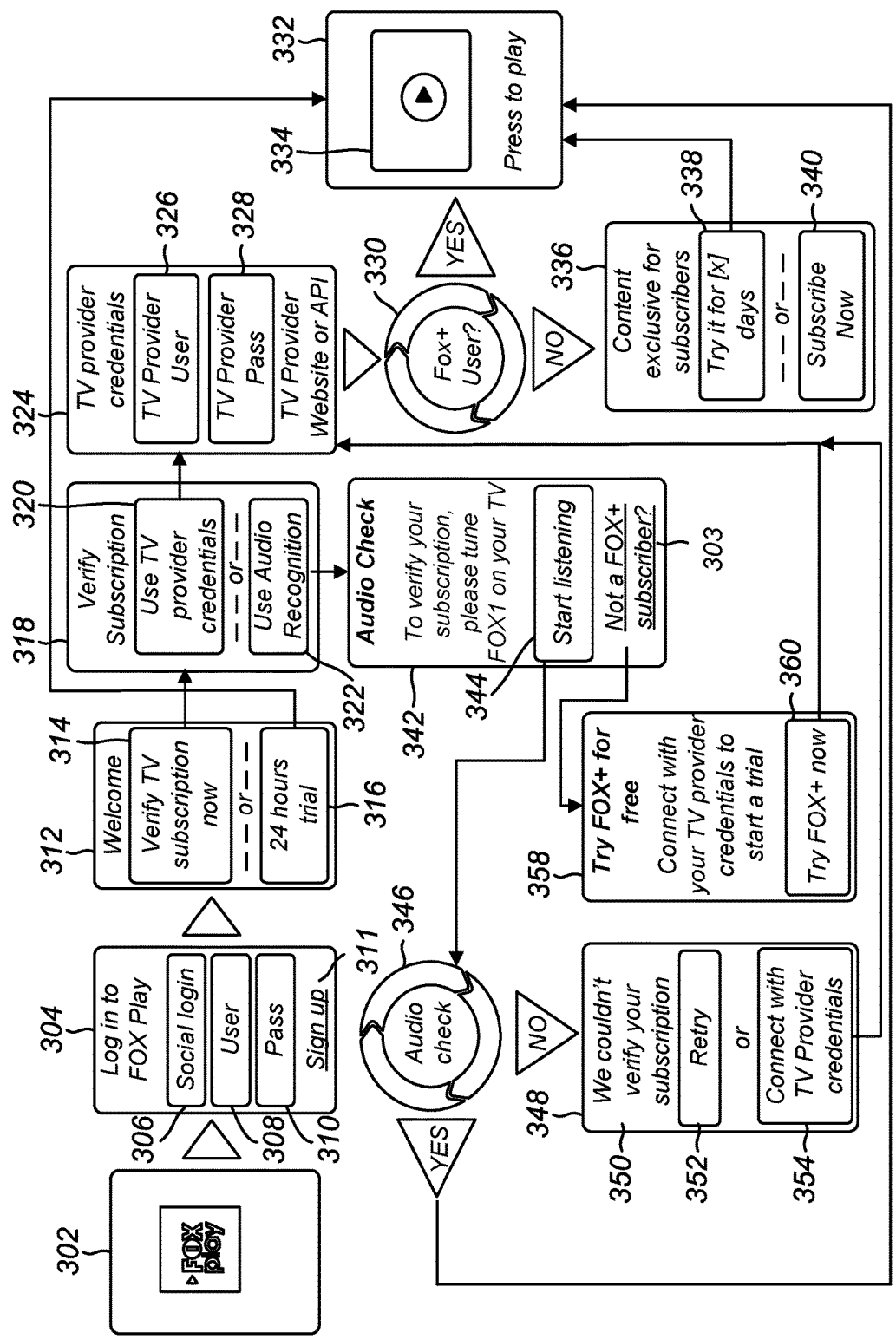
FIG. 3 is a diagram illustrating one embodiment of a progression of a user interface presented by one or more screens on a display device integrated with or comprised with the secondary receiver.

FIG. 3 is a diagram illustrating one embodiment of a progression of a user interface presented by one or more screens on a display device integrated with or comprising the secondary receiver 106B. Screen 302 is a home screen of the CPA 108B installed on the secondary receiver 106B. After the home screen 302 is displayed, a login screen 304 is displayed by the CPA 108B. The login screen 304 allows the user 112 to log in to the remote playback service by entering a suitable credential, or to sign up for the remote playback service. In the illustrated embodiment, the login screen 304 comprises a first input field 308 for the user 112 to enter a username, email address, or other identifier, and an input field 310 for the user to enter a password. These input fields may be used by users 112 who have already signed up for the remote playback services to login.

If the user 112 is not signed up for the remote playback service, they may select control 311, and they will be directed to a screen (not illustrated) which requests that the user 112 enters a user identifier and password, so that they may log in to the service in the future. Control 306 allows the user 112 to log in via a social network login such as FACEBOOK or TWITTER using the user's credentials for that social network. If there is no existing remote playback service (RPS) ID for the user 112, one is created, and the user 112 is requested to enter additional information such as their email address. If there is an existing RPS ID for the user, another ID may be created, or the information entered by the user may be merged with the previous ID. This information, along with the IP address of the secondary playback device 106B and secondary playback device ID is stored for future use.

In any case, whether by signing up for remote playback service of logging in to the remote playback service via entered username and password or social network, the entered information is transmitted to the content provider 102 via the CPA 108B, and if the user's login credentials are valid, the content provider 102 transmits data to the secondary receiver 106B via the CPA 108B to present welcome screen 312. Welcome screen 312 gives the user 112 the choice of either accepting a trial of the remote playback service for a limited period of time (as illustrated, 24 hours) or to verify that the user 112 of the secondary receiver 106B is an authorized subscriber to the content of the content provider 102 via their subscription to an authorized service provider 104. If the user selects the control 316 with the time-limited subscription, the CPA 108B transmits that selection to the content provider 102, which authorizes a limited time subscription to the remote playback service, and transmits messages and data to the CPA 108B permitting the user 112 to view such media programs for a limited time, for example, using playback screen 332, and allowing the user to commence playback of a media program by selecting play control 334.

If the user selects control 314 to verify the user's subscription to a service provider 104 that offers the media programs and other content supplied by the content provider 102, the user is presented with screen 318. Screen 318 includes a first control 320, which causes the CPA 108B to present screen 324. Screen 324 is a service provider credential entry screen that permits the user to enter the identify of the service provider 104 the user is subscribed to, and the user's credentials for that service provider 104, using username input field 326 and password input field 328. That information is transmitted to the content provider 102, to confirm that the user 112 is indeed a subscriber to that service provider 104. As described above, this is typically accomplished by forwarding the entered credentials to the service provider 104 chosen by the user 112, and receiving a confirmation from that service provider 104 that the user 112 is a subscriber to a service package of that service provider 104 that includes the media programs supplied by the content provider 102. If the user 112 is confirmed as a subscriber to the selected service provider 104, decision logic 330 directs the CPA 108B to present screen 332, and the secondary device 106B is provided media programs and other content from the content provider 102. If the user 112 is not confirmed as a subscriber to the selected service provider, processing is passed to block 336, which offers the user to either try the subscriber package for a limited time (by selecting control 338) or to subscribe indefinitely, by selecting control 340. If either control 338 or 340 is selected, the interface presents screen 332.

As described above, the foregoing presumes that the user 112 has taken the step of creating a user account with the service provider 104 and remembers those credentials. Screen 318 also comprises a second control that allows the user 112 to authenticate the secondary receiver 106B without entering such credentials, so long as they are near enough in the vicinity to their primary receiver 106A to receive an audio signal. This automatic audio (autoaudio)

authentication process is selected by selecting control 322. Selection of control 322 transmits an identifier of the secondary receiver 106B or identifier of the CPA 108B and data describing the location of the secondary receiver 106B to the content provider 102.

The content provider 102 may then transmit data to the CPA 108B of the secondary receiver 106B that prompts the user to enter the identity of the user's service provider 104. Using that information and the location of the secondary receiver 106B, the content provider selects an authorization channel as described above, and sends data to the secondary receiver 106B implementing screen 342. Screen 342 includes information instructing the user to tune to the authorization channel selected by the content provider 102, and a control that commands the secondary receiver 106B to activate a microphone to begin sensing the audio content of the media program being currently transmitted by the selected service provider 104 and received by the user's primary receiver 106A. The audio content is sensed by the secondary receiver 106B, and compared to the audio content transmitted by the service provider, as shown in logic 346. As described above, such operations may be performed by the secondary receiver 106B, the ARS 110, or the content provider 102, or any combination thereof.

If the comparison demonstrates that the audio content received directly from the service provider 104 and the audio content received via the primary receiver 106A and secondary receiver 106B sufficiently match, the content provider 102 authorizes the secondary receiver 106B to receive (and reproduce) media programs from the content provider 102. This can be implemented by transmitting a suitable key or credential to the CPA 108B executing on the secondary receiver 106B. Screen 332 (previously described) is then provided.

If the audio check is unsuccessful, screen 348 is presented by the CPA 108B of the secondary receiver 106B. Screen 348 includes a retry control 352, which routes processing back to screen 342 to allow the user to retry the autoaudio authentication process. Screen 348 also includes a control allowing the user 112 to selectably return to manually providing the credentials of their service provider 104 using screen 324.

Returning to screen 342, in addition to offering autoaudio authentication, the user 112 may also select control 303, which provides screen 358. Screen 358 queries the user 112 regarding whether they would like to become a subscriber for remote playback by entering the credentials of their service provider 104 (and hence, no longer require occasional autoaudio authentication). If the user 112 selects control 360, they are referred to screen 324.

Collectively, the user interface presented in the foregoing screens allows the user to use autoaudio authentication, but inserts options in the path of the process, giving the user the opportunity to authenticate the secondary receiver 106B by the typical process of providing a password.

In one embodiment, the foregoing "autoaudio" authentication process described above authorizes the secondary receiver 106B to receive media programs from the content provider 102 only for a limited time period (a period time much less than the user 112 is likely to remain a subscriber to the service provider 104 . . . a typical value being in the order of a week or a month). In this embodiment, the user 112 is permitted to use the remote playback service to become acquainted with its advantages, and is thereafter more willing to become a permanent registrant for the service by entering the credentials as illustrated in interface 324. The user 112 may also be limited to a particular number of sessions authorized via audio recognition.

While the foregoing operations have been described in terms of using audio data to authorize reception of the one or more media programs by the secondary receiver based upon reception of at least one of the media programs by a primary receiver, other embodiments are within the scope of this disclosure. For example, video data, image data, or audio and video data may be used for the same purpose. Accordingly, in this disclosure, the audio content and audio data may be more broadly described as video content, video data, image content, or image data, as appropriate without loss of generality.

For example, after the primary receiver 106A is tuned to the authorization channel and begins receiving and reproducing the transmitted first media program, the secondary receiver 106B may be used to sense the reproduced transmitted media program (e.g. with a video camera included with or communicatively coupled to the secondary receiver 106B) and generate video data that is compared to video data of the transmitted first media program, much the same way that the audio data is compared in the earlier described embodiments. This generated video data may also be used in conjunction with the audio data previously described, thus permitting a more accurate and/or rapid authorization of the secondary receiver 106B. Embodiments using one or more single frame images are also envisioned. For example, after the primary receiver 106A is tuned to the authorization channel and begins receiving and reproducing the transmitted first media program, the secondary receiver 106B may be used to take one or more photographic images of the reproduced transmitted media program (e.g. with a camera included with or communicatively coupled to the secondary receiver 106B) and generate image data that is compared to video data of the transmitted first media program, much the same way that the audio data is compared in the earlier described embodiments. The image data may be time-tagged to indicate the precise moment when the photograph was taken, and the time-tagged image data compared with image data from corresponding times taken from the media program transmitted by the service provider 104 to determine whether to authorize the secondary receiver. Image data may also be used in conjunction with the audio data previously described.

In another embodiment, the foregoing authentication process forms a part of a user 112 scoring index associated with a user identifier (ID) based on user activity and other available information. This user scoring index is used to allow or revoke access to content from the content provider 102. Such variables may include the user's internet service provider (ISP) history, social networking IDs, Internet protocol (IP) connection history, or other factors. Such information can be obtained and managed for each secondary receiver 106B associated with the user ID.

Hardware Environment

Figure 4:
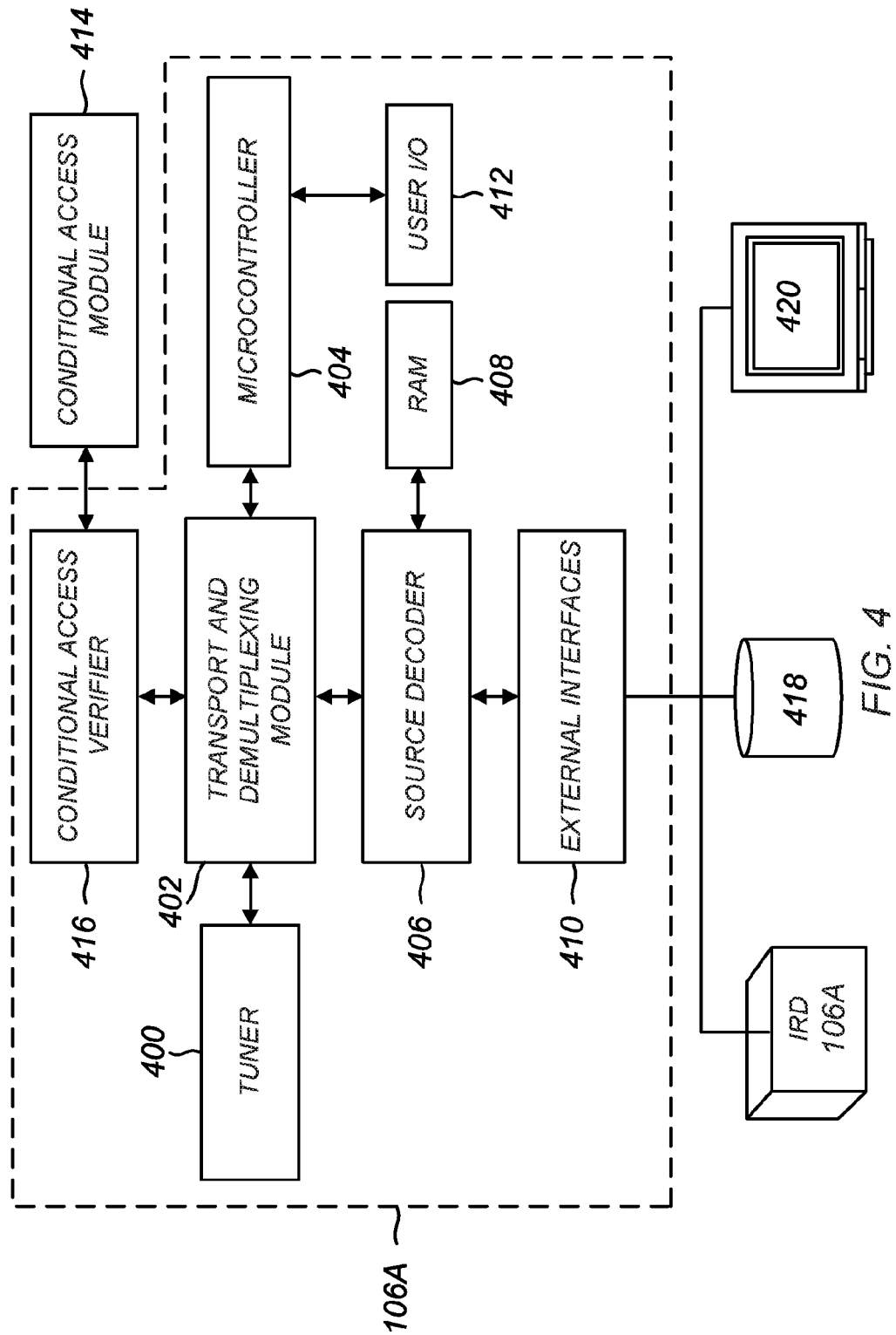
FIG. 4 is a diagram illustrating an exemplary system that could be used to implement elements of the present invention.

FIG. 4 is a simplified block diagram of a primary receiver 106A such as an IRD. The IRD 106A includes a tuner 400, a transport and demultiplexing module (TDM) 402 that operates under the control of a microcontroller 404 to perform transport, demultiplexing, decryption and encryption functions, a source decoder 406, random access memory (RAM) 408, external interfaces 410, user I/O 412, a conditional access module (CAM) 414, and conditional access verifier (CAV) 416.

The tuner 400 receives the data packets from an antenna or cable and provides the packets to the TDM 402. Using the IDs associated with the program materials, the TDM 402 and microcontroller 404 reassemble the data packets according to the channel selected by the subscriber and indicated by the user I/O 412, and decrypt the program materials.

Once the program materials have been decrypted, they are provided to the source decoder 406, which decodes the program materials according to MPEG or other standards as appropriate. The decoded program materials may be stored in the RAM 408 or provided to devices coupled to the IRD 106A via the external interfaces 410, wherein the devices coupled to the IRD 106A can include or a media storage device 418, such as a disk drive, a presentation device 420, such as a monitor, a networked device, such as another IRD 106A.

The CAM 414 is typically implemented in a smartcard or similar device, which is provided to the subscriber to be inserted into the IRD 106A. The CAM 414 interfaces with the CAV 416 and the TDM 402 to verify that the IRD 106A is entitled to access the program materials.

In one embodiment including a plurality of networked IRDs 106A, one of the IRDs 106A is designated a "host IRD" (or host device) and each of the other IRDs are designated as a "client IRD" (or client device). In such an embodiment, the host IRD 106A includes all of the components described in FIG. 4, while the client IRDs 106A may not include the tuner 400, CAM 414, CAV 416, disk drive 418, or other components, in order to reduce the cost of the client IRD 106A. The client IRD 106A can be used to request program materials that are received or reproduced by the host IRD 106A, thus allowing program materials to be reproduced at other locations in the home.

However, in this embodiment, there is no master-slave relationship, and all IRDs 106A have the capability to decrypt the program materials. Moreover, the host and client IRDs 106A share the CW by means of a pairing key (PK) that is generated by the service provider for the purposes of allowing each IRD 106A to decrypt the program materials. Consequently, this allows for the distribution of broadcast content between a host IRD 106A and one or more client IRDs 106A for remote decryption and viewing.

Figure 5:
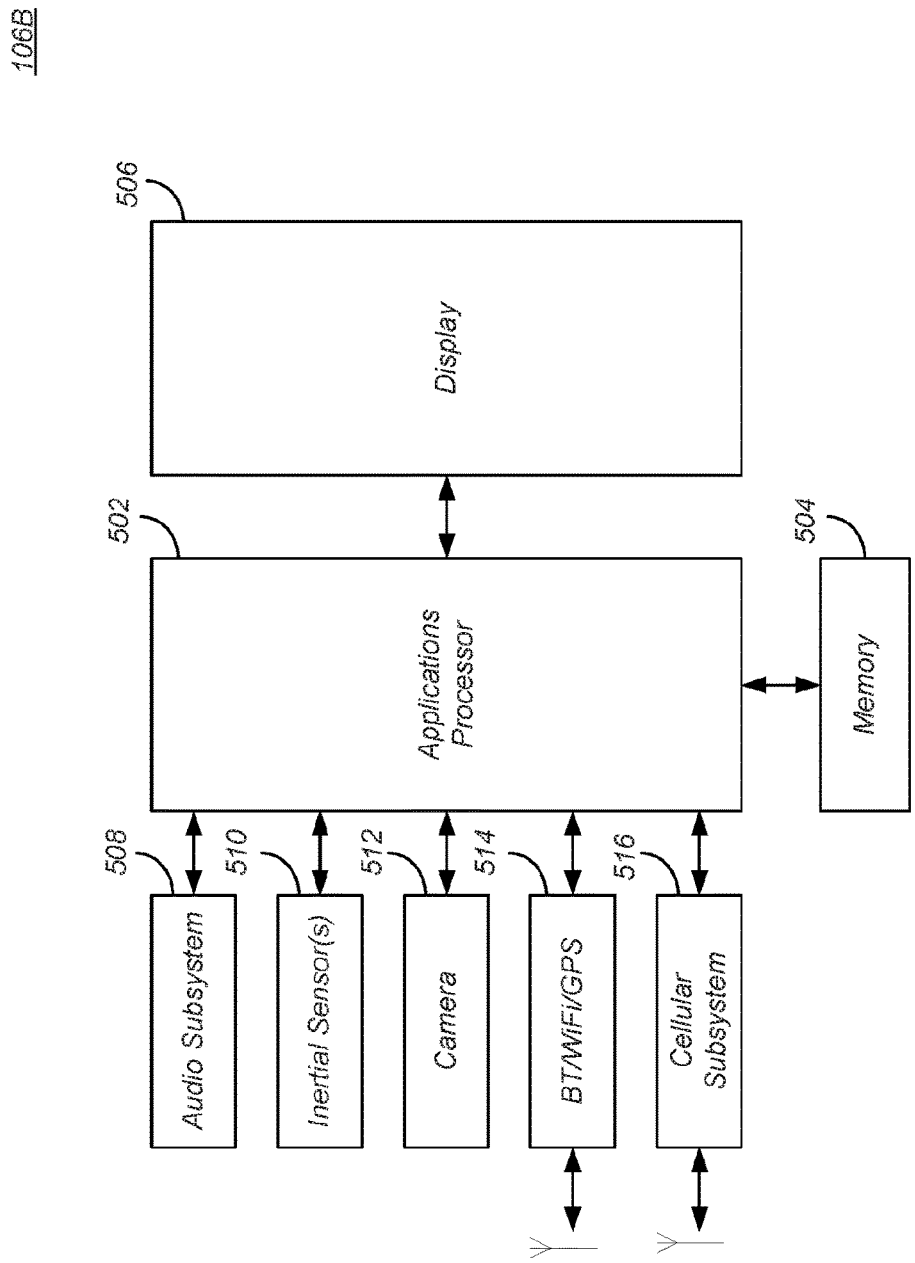
FIG. 5 is a diagram illustrating an exemplary system that can be used to implement the secondary receiver.

FIG. 5 is a diagram of an exemplary secondary receiver 106B. In the illustrated embodiment, the secondary receiver 106B is evidenced by a smartphone or similar device, and comprises an applications processor 502 communicatively coupled to a memory 504 storing instructions for performing applications processor 502 functions. The applications processor is also communicatively coupled to a display 506 to provide visual output to the user 112 and to accept user 112 input, for example via touch screen operations on the display 506. The applications processor can execute, for example, the CPA 108B.

The applications processor 502 is also communicatively coupled to an audio subsystem 508, an inertial sensor subsystem 510, a camera subsystem 512, an auxiliary communications subsystem 514 and a cellular communications subsystem 516. Each of these subsystems may also include a special purpose processor communicatively coupled to an associated memory for performing the functions allocated to that subsystem.

The audio subsystem 508 typically comprises one or more microphones and speakers, and is used to provide audio information to the applications processor 502 and receive processed audio data and information and aurally reproduce this data for the user 112 to hear. Typically, the audio subsystem also includes a codec (encoder/decoder) which encodes audio signals for analysis and transmission and decodes encoded audio signals for reproduction, with such codecs being implemented using the special purpose processor of the audio subsystem. Alternatively, such codecs can be implemented by the applications processor 502.

The inertial sensor subsystem 510 may include rate sensors such as gyros and/or linear force sensors such as accelerometers. These inertial sensors can be used to determine the location and orientation of the secondary receiver 106B.

The camera subsystem 512 includes a lens and visual sensor that can be used to take photographs or videos.

The auxiliary communications subsystem 514 may include a Bluetooth transceiver, WiFi transceiver, and/or Global Positioning System (GPS) receiver. The Bluetooth transceiver permits the secondary receiver 106B to exchange data with a remote device so that the remote device or the secondary receiver 106B can exchange data and commands. Similarly, the WiFi transceiver allows the secondary receiver 106B to exchange data and commands with external entities such as other WiFi equipped systems, and may provide the secondary receiver 106B with access to Internet communications. The GPS receiver and system permits the secondary receiver 106B to precisely determine its location from GPS satellite transmissions.

The cellular subsystem 516 allows the secondary receiver 106B to transceive telephone calls, text messages, and to transmit and receive information via the Internet by 3G, LTE or similar modem implemented therein. Typically, cellular communications comprise a communication protocol in which the secondary receiver 106B and a cellphone tower wirelessly communicate with each other for command/control and data transfer purposes, and the location of such cellphone tower may be used to determine the approximate geographical location of the secondary receiver 106B.

Figure 6:
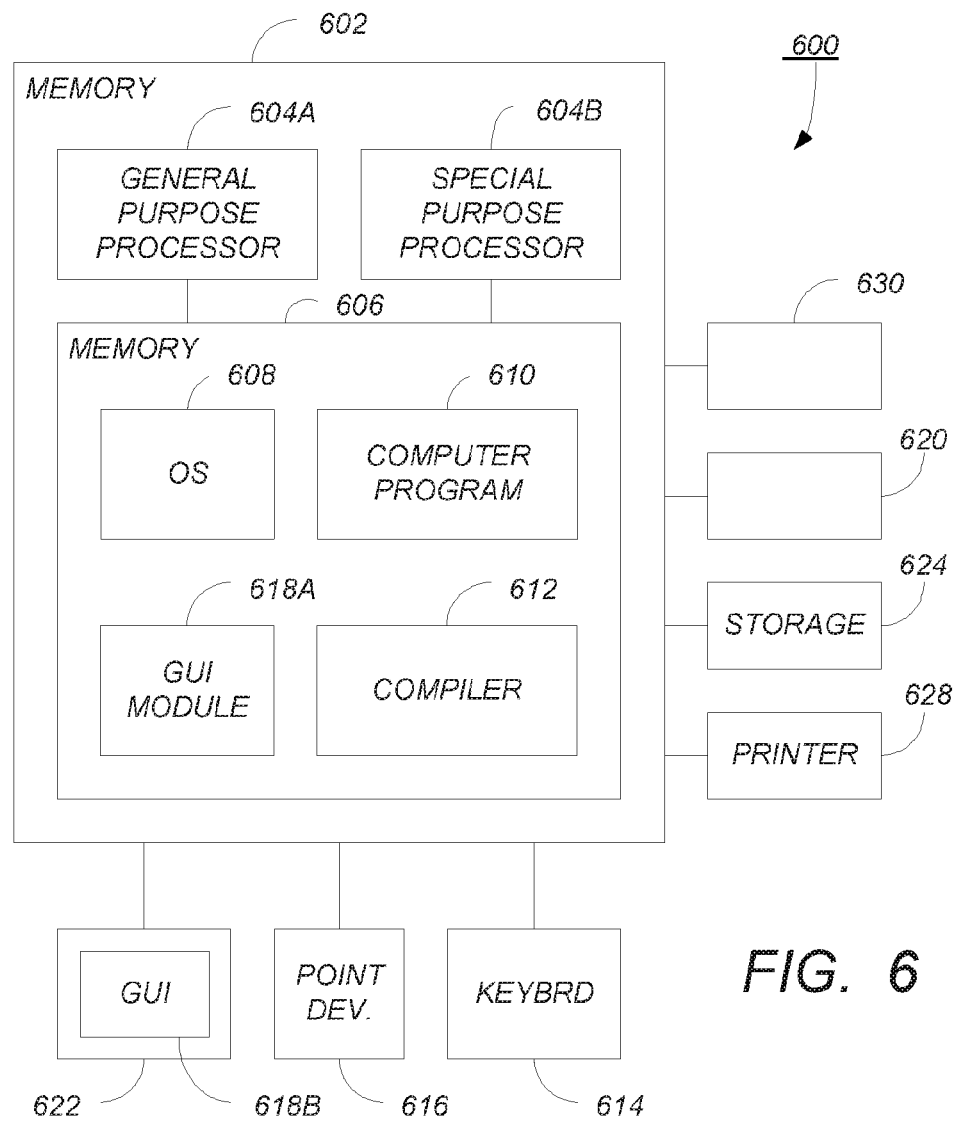
FIG. 6 is a diagram illustrating an exemplary system that could be used to implement elements of the present invention.

FIG. 6 is a diagram illustrating an exemplary system 600 that could be used to implement elements of the present invention, including the primary receiver 106A, the secondary receiver 106B, and computer systems implementing the functionality of the service provider 104, ARS 110, and content provider 102. That system comprises a processing device 602 which comprises a general purpose hardware processor 604A and/or a special purpose hardware processor 604B (hereinafter alternatively collectively referred to as processor 604) and a memory 606, such as random access memory (RAM). The computer 602 may be coupled to other devices, including input/output (I/O) devices such as a keyboard 614, a mouse device 616 and a printer 628.

In one embodiment, the processing device 602 operates by the general purpose processor 604A performing instructions defined by the computer program 610 under control of an operating system 608. The computer program 610 and/or the operating system 608 may be stored in the memory 606 and may interface with the user and/or other devices to accept input and commands and, based on such input and commands and the instructions defined by the computer program 610 and operating system 608 to provide output and results.

Output/results may be presented on the display 622 or provided to another device for presentation or further processing or action. In one embodiment, the display 622 comprises a liquid crystal display (LCD) having a plurality of separately addressable pixels formed by liquid crystals. Each pixel of the display 622 changes to an opaque or translucent state to form a part of the image on the display in response to the data or information generated by the processor 604 from the application of the instructions of the computer program 610 and/or operating system 608 to the input and commands. Other display 622 types also include picture elements that change state in order to create the image presented on the display 622. The image may be provided through a graphical user interface (GUI) module 618A. Although the GUI module 618A is depicted as a separate module, the instructions performing the GUI 618B functions can be resident or distributed in the operating system 608, the computer program 610, or implemented with special purpose memory and processors.

Some or all of the operations performed by the processing device 602 according to the computer program 610 instructions may be implemented in a special purpose processor 604B. In this embodiment, some or all of the computer program 610 instructions may be implemented via firmware instructions stored in a read only memory (ROM), a programmable read only memory (PROM) or flash memory within the special purpose processor 604B or in memory 606. The special purpose processor 604B may also be hardwired through circuit design to perform some or all of the operations to implement the present invention. Further, the special purpose processor 604B may be a hybrid processor, which includes dedicated circuitry for performing a subset of functions, and other circuits for performing more general functions such as responding to computer program instructions. In one embodiment, the special purpose processor is an application specific integrated circuit (ASIC).

The processing device 602 may also implement a compiler 612 which allows an application program 610 written in a programming language such as COBOL, C++, FORTRAN, or other language to be translated into processor 604 readable code. After completion, the application or computer program 610 accesses and manipulates data accepted from I/O devices and stored in the memory 606 of the processing device 602 using the relationships and logic that was generated using the compiler 612.

The processing device 602 also optionally comprises an external communication device such as a modem, satellite link, Ethernet card, or other device for accepting input from and providing output to other computers.

In one embodiment, instructions implementing the operating system 608, the computer program 610, and/or the compiler 612 are tangibly embodied in a computer-readable medium, e.g., data storage device 620, which could include one or more fixed or removable data storage devices, such as a zip drive, floppy disc drive 624, hard drive, CD-ROM drive, tape drive, or a flash drive. Further, the operating system 608 and the computer program 610 are comprised of computer program instructions which, when accessed, read and executed by the processing device 602, causes the processing device 602 to perform the steps necessary to implement and/or use the present invention or to load the program of instructions into a memory, thus creating a special purpose data structure causing the computer to operate as a specially programmed computer executing the method steps described herein. Computer program 610 and/or operating instructions may also be tangibly embodied in memory 606 and/or data communications devices 630, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the processing device 602.

Although the term "computer" or "processing device" is referred to herein, it is understood that the computer may include portable devices such as cellphones, smartphones, laptops, tablet computers, portable MP3 players, video game consoles, notebook computers, pocket computers, or any other device with suitable processing, communication, and input/output capability.

Conclusion

This concludes the description of the preferred embodiments of the present invention. In summary, the present invention describes a method, apparatus, and article of manufacture. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of authorizing reception of one or more media programs of a content provider by a secondary receiver based upon reception of a first media program of the one or more media programs by a primary receiver authorized by a service provider to receive the one or more media programs of the content provider, the method comprising:
   receiving location data from the secondary receiver;
   initiating authorized reception of a transmission of the first media program from the service provider by the primary receiver, the transmitted first media program having media content;
   receiving media data from the secondary receiver, the media data generated from the media content of the first media program reproduced by the primary receiver and sensed by the secondary receiver; and
   authorizing reception of the one or more media programs from the content provider by the secondary receiver according to the received location data and a comparison of the media data received from the secondary receiver and the media content of the transmission of the first media program.

2. The method of claim 1, wherein the first media program is received in real time by an authorized primary receiver.

3. The method of claim 1, wherein the step of initiating authorized reception of the transmission of the first media program having media content by the primary receiver comprises:
   transmitting a message to the secondary receiver instructing the reception of the media content of the first media program by the primary receiver.

4. The method of claim 1, wherein the location data is generated at least in part from at least one of:
   location data derived from a global positioning satellite (GPS) system;
   location data derived from a network address of the secondary receiver; and
   location data of a cellphone transmitter.

5. The method of claim 1, wherein the step of authorizing reception of the one or more programs of the content provider by the secondary receiver according to the received location data and a comparison of the media data received from the secondary receiver and the media content of the transmitted first media program comprises:
   determining if the secondary receiver is located in an approved location according to the received location data;
   comparing the received media data to the media content of the transmitted first media program; and
   authorizing the reception of the one or more programs of the content provider if the secondary receiver is located in the approved location and the received media data sufficiently matches the media content of the transmitted first media program.

6. The method of claim 1, wherein the authorizing of the reception self expires after a period of time.

7. The method of claim 1, wherein the media content comprises audio content and the media data comprises audio data.

8. The method of claim 1, wherein the step of initiating reception of a transmission of the first media program from the service provider by the primary receiver, the transmission of the first media program having media content comprises:
   identifying one or more service providers providing the media program at least in part according to the received location data, the one or more service providers including the service provider;
   transmitting a request to the secondary receiver to select a selected service provider from the identified one or more service providers;
   receiving the selection of the service provider; and
   selecting the authorization channel according to the received selected service provider.

9. The method of claim 3, wherein the message instructs tuning the primary receiver to an authorization channel of the authorized service provider, wherein the first media program is transmitted on the authorization channel.

10. The method of claim 9, wherein the authorization channel is determined according to the received location data.

11. The method of claim 10, wherein the authorized channel specified in the transmitted message differs for other secondary receivers in a geographical region determined from the received location data.

12. The method of claim 10, wherein the transmitted first media program is not synchronously transmitted on a non-subscription basis.

13. The method of claim 11, wherein the message is presented by the secondary receiver.

14. The method of claim 13, wherein:
   the message further instructs the tuning of the primary receiver to a sequence of authorization channels;
   the reception of the one or more programs of the content provider by the secondary receiver is authorized according to the received location data and a comparison of the media data received from the secondary receiver and media content of further media programs transmitted on the sequence of authorization channels.

15. The method of claim 4, wherein the step of receiving location data from the secondary receiver comprises the step of commanding the secondary receiver to transmit the location data.

16. The method of claim 5, wherein the step of authorizing the reception of the one or more programs of the content provider if the secondary receiver is located in the approved location and the received media data sufficiently matches the media content of the transmitted first media program comprises:
   storing a timestamped version of the media content of the transmitted first media program; and
   comparing the stored timestamped version of the media content of the transmitted first media program with a timestamped version of the received media data.

17. The method of claim 16, wherein the received media data of the media program is timestamped by the secondary receiver before reception.

18. The method of claim 16, wherein the received media content of the media program is timestamped after reception.

19. An apparatus for authorizing reception of one or more media programs of a content provider by a secondary receiver based upon reception of a media program by a primary receiver authorized by a service provider to receive the one or more media programs of the content provider, comprising:
   a processor, communicatively coupled to a memory, the memory storing instructions comprising instructions for instructing the processor to:
   receive location data from the secondary receiver;
   initiate authorized reception of a transmission of the first media program from the service provider by the primary receiver, the transmitted first media program having media content;
   receive media data from the secondary receiver, the media data generated from the media content of the first media program reproduced by the primary receiver and sensed by the secondary receiver; and
   authorize reception of the one or more media programs from the content provider by the secondary receiver according to the received location data and a comparison of the media data received from the secondary receiver and the media content of the transmission of the first media program.

20. The apparatus of claim 19, wherein the first media program is received in real time by an authorized viewer.

21. The apparatus of claim 19, wherein the instructions for instructing the processor to authorize reception of the one or more programs of the content provider by the secondary receiver according to the received location data and a comparison of the media data received from the secondary receiver and the media content of the transmitted first media program further comprise instructions for instructing the processor to:
   determine if the secondary receiver is located in an approved location according to the received location data;
   compare the received media data to the media content of the transmitted first media program; and
   authorize the reception of the one or more programs of the content provider if the secondary receiver is located in the approved location and the received media data sufficiently matches the media content of the transmitted first media program.

22. The apparatus of claim 21, wherein the instructions commanding the processor to authorize the reception of the one or more programs of the content provider if the secondary receiver is located in the approved location and the received media data sufficiently matches the media content of the transmitted first media program further comprise instructions for instructing the processor to:
   store a timestamped version of the media content of the transmitted first media program; and compare the stored timestamped version of the media content of the transmitted first media program with a timestamped version of the received media data.

23. A method of authorizing reception of one or more media programs of a content provider by a secondary receiver based upon reception of a first media program of the one or more media programs by a primary receiver authorized by a service provider to receive the one or more media programs of the content provider, the method, comprising:

transmitting location data from the secondary receiver;

sensing, with the secondary receiver, authorized reception of a transmission of media content of the first media program that is received from the service provider and reproduced by the primary receiver, the authorized reception of the transmission of the media content initiated based at least in part on the transmitted location data;

generating media data from the sensed media content of the first media program; and transmitting the media data from the secondary receiver;

wherein the reception of the one or more media programs from the content provider by the secondary receiver is authorized according to a comparison of the transmitted media data and the media content of the first media program.

* * * * *